(12) United States Patent
Huang

(10) Patent No.: US 9,317,061 B2
(45) Date of Patent: Apr. 19, 2016

(54) ELECTRONIC DEVICE ENCLOSURE

(71) Applicant: HON HAI PRECISION INDUSTRY CO., LTD., New Taipei (TW)

(72) Inventor: Hsieh-Ting Huang, Miaoli (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 238 days.

(21) Appl. No.: 14/185,927

(22) Filed: Feb. 21, 2014

(65) Prior Publication Data

US 2014/0346935 A1 Nov. 27, 2014

(30) Foreign Application Priority Data

May 21, 2013 (CN) .......................... 2013 1 0189410

(51) Int. Cl.
 *H05K 5/03* (2006.01)
 *G06F 1/16* (2006.01)
(52) U.S. Cl.
 CPC .................................. *G06F 1/1601* (2013.01)

(58) Field of Classification Search
 None
 See application file for complete search history.

(56) References Cited

U.S. PATENT DOCUMENTS

2008/0055832 A1* 3/2008 Ozolins .................. F16M 11/04
 361/679.04

* cited by examiner

*Primary Examiner* — Tracy Li
*Assistant Examiner* — Nam Pham
(74) *Attorney, Agent, or Firm* — Novak Druce Connolly Bove + Quigg LLP

(57) ABSTRACT

An electronic device enclosure includes a rear cover. The rear cover includes at least one first segment and at least one second segmentation. The at least one first segment includes a first securing portion, and the at least one second segment includes a second securing portion. The first securing portion is secured to the second securing portion, so that the at least one first segment and at least one second segment together define the rear cover.

7 Claims, 9 Drawing Sheets

ELECTRONIC DEVICE ENCLOSURE

FIELD

The present disclosure relates to electronic device enclosures.

BACKGROUND

Electronic device enclosures, such as a computer display, usually include a frame and a rear cover engaged with the frame. The frame is often detached from the rear cover for easy transportation. However, a size of the rear cover or the frame is so large that transportation of the rear cover is inconvenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
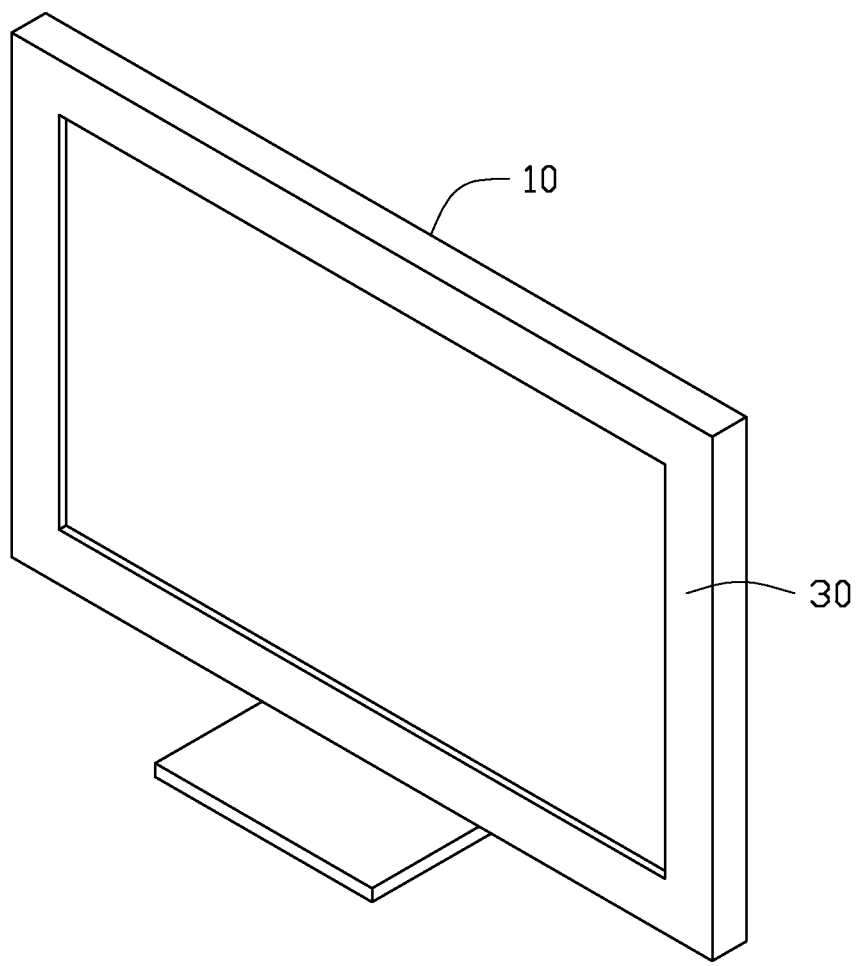
FIG. 1 is an isometric view of one embodiment of an electronic device enclosure.

FIG. 1 illustrates an embodiment of an electronic device enclosure. The electronic device enclosure comprises a rear cover 10 and a frame 30 secured to the rear cover 10. In one embodiment, the electronic device enclosure is an enclosure of a display.

Figure 2:
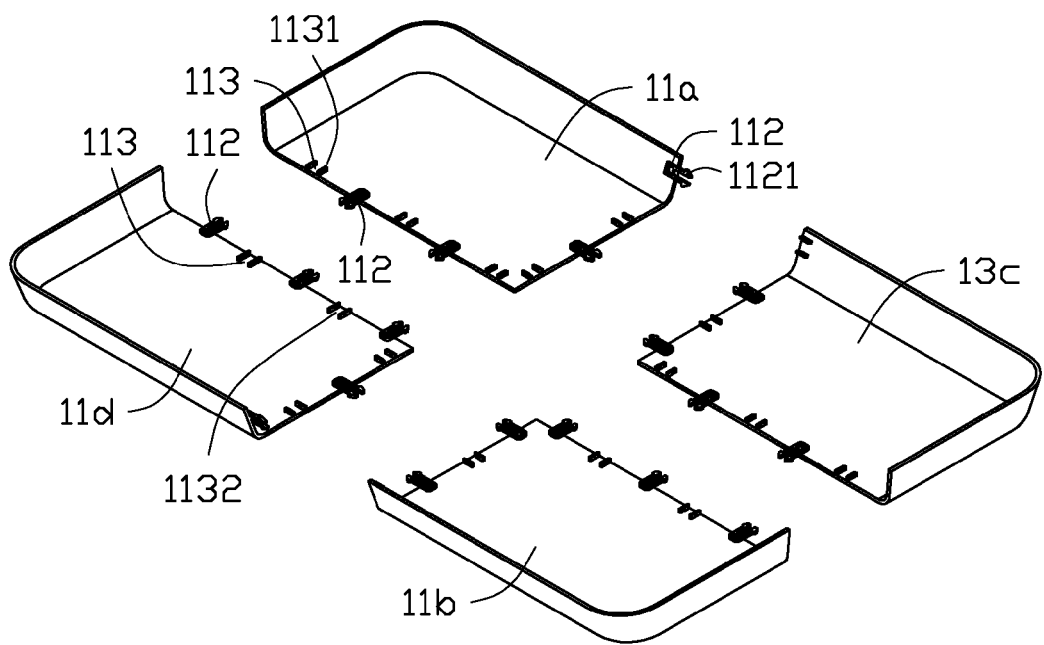
FIG. 2 is an exploded, isometric view of a rear cover of the electronic device enclosure of FIG. 1.
Figure 3:
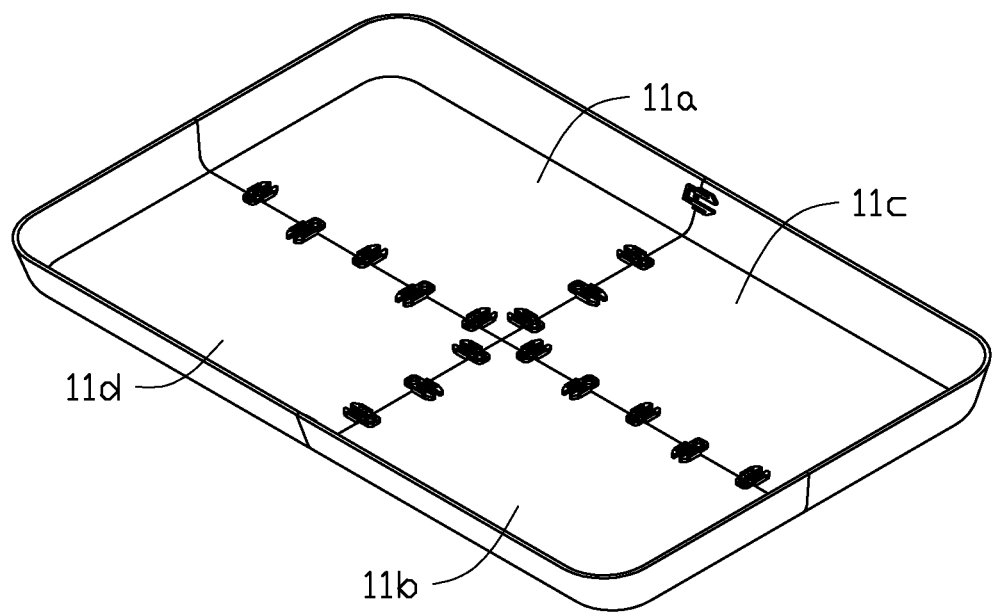
FIG. 3 is an assembled view of the rear cover of FIG. 2.

FIGS. 2-3 illustrate one embodiment of the rear cover 10. In the embodiment of FIGS. 2-3, the rear cover 10 comprises a first segment 11a, a second segment 11b, a third segment 11c, and a second segment 11d. In one embodiment, the first segment 11a can be the same as the second segment 11b, the third segment 11c can be the same as the fourth segment 11d, but different from the first segment 11a. In another embodiment, the first, second, third, and fourth segments 11a, 11b, 11c, 11d have a same configuration. The first, second, third, and fourth segments 11a, 11b, 11c, 11d can be combined to form the rear cover 10.

The first segment 11a defines a plurality of first securing portions 112 and a plurality of second securing portions 113. The fourth segment 11d also defines a plurality of first securing portions 112 and a plurality of second securing portions 113. Each first securing portion 112 comprises two resilient hooks 1121 extending from the first segment 11a or the second cover segment 13a. In one embodiment, an acute angle is formed between the two resilient hooks 1121. Each second securing portion 113 comprises two parallel securing ribs 1131. A clipping hole 1132 is formed between the two parallel securing ribs 1131. In one embodiment, the second and fourth segments 11b, 11c also defines a plurality of first securing portions 112 and a plurality of second securing portions 113.

FIG. 3 illustrates that in assembly, the hooks 1121 are located in the clipping holes 1132 and deformed by the securing ribs 1131. When the hooks 1121 extend through corresponding clipping holes 1132, the hooks 1121 releasably engage with the securing ribs 1131. Thus, the first, second, third, and fourth segments 11a, 11b, 11c, 11d can be combined to form the rear cover 10.

Figure 4:
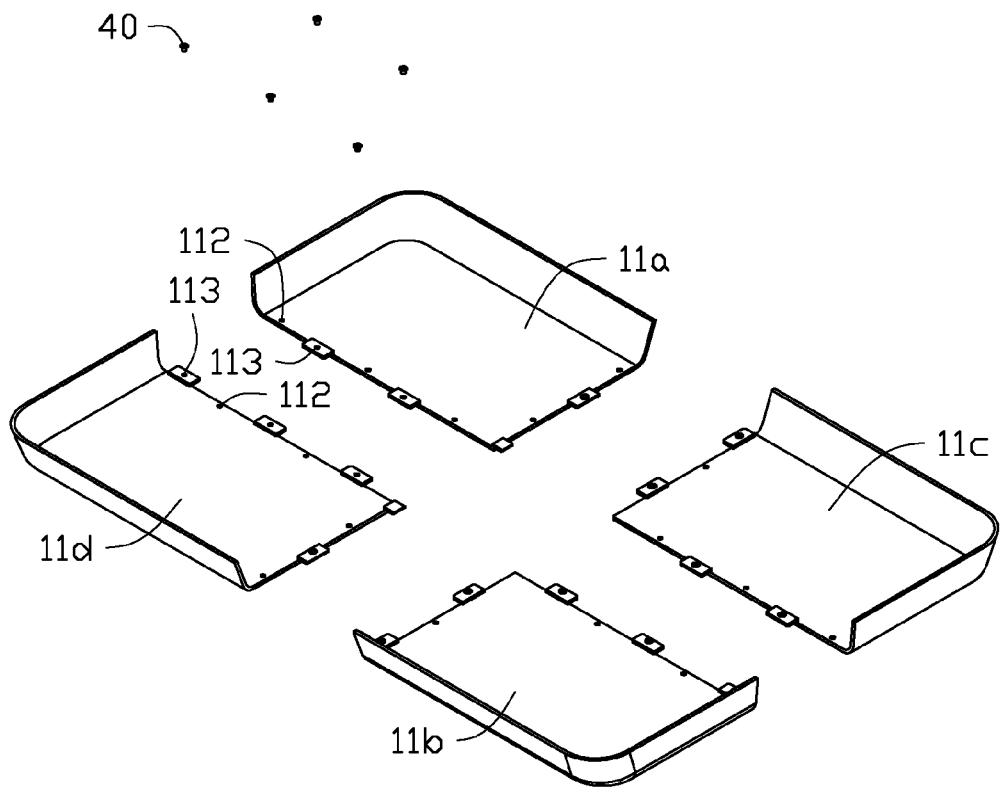
FIG. 4 is an exploded, isometric view of a rear cover of another embodiment of an electronic device enclosure.
Figure 5:
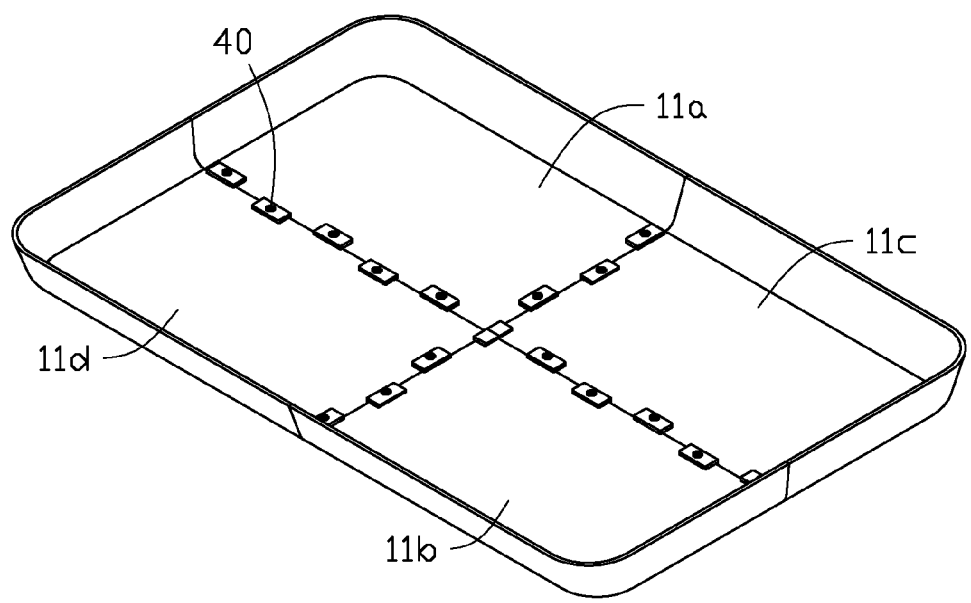
FIG. 5 is an assembled view of the rear cover of FIG. 4.

FIGS. 4-5 illustrate another embodiment of a rear cover 10. Each first securing portion 112 is a securing hole, and each second securing portion 113 is a securing panel with a retaining hole. The securing panel can extend from a first segment 11a or a second segment 11b. A mounting member 40, such as a screw, is inserted into the securing hole of the securing portion 112 and the retaining hole of the second securing portion 113, to engage the two first segments 11a to the two second segments 13a.

Figure 6:
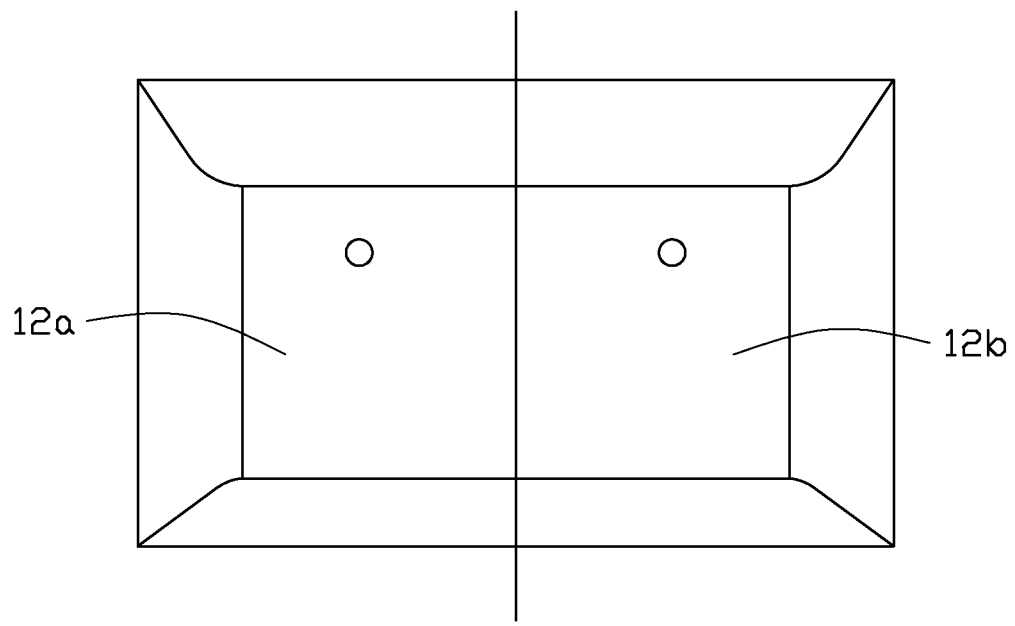
FIG. 6 is a schematic diagram of a rear cover of yet another embodiment of an electronic device enclosure.

FIG. 6 illustrates yet another embodiment of a rear cover 10. The rear cover 10 comprises a first segment 12a and a second segment 12b. In one embodiment, the configuration of the first segment 11b is same as the configuration of the second segment 13b. The first segment 11b is engaged with the second segment 13b by one or more hooks or screws.

Figure 7:
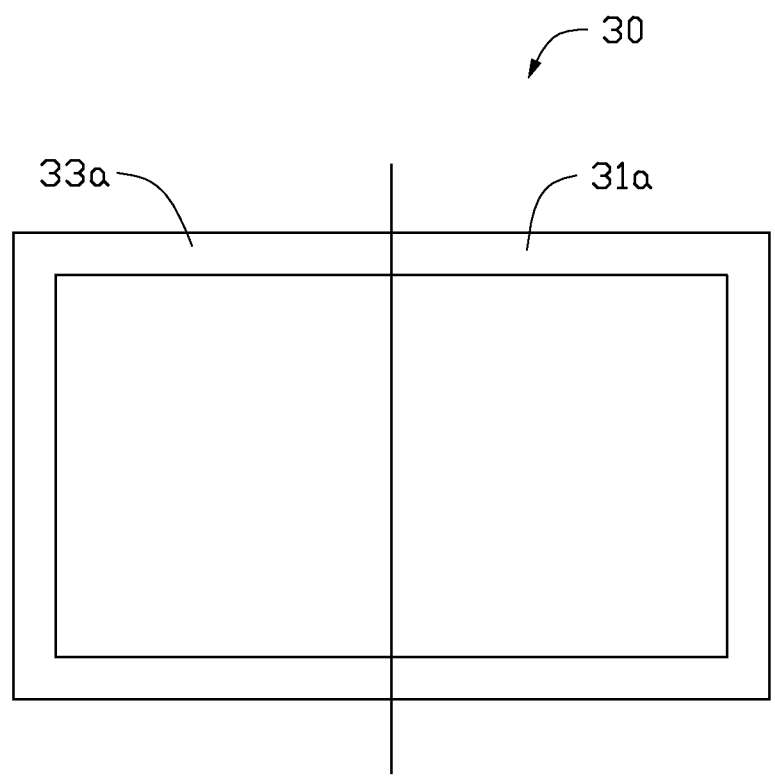
FIG. 7 is a schematic diagram of a frame of one embodiment of an electronic device enclosure.

FIG. 7 illustrates one embodiment of a frame 30. The frame 30 comprises a first part 31a and a second part 33a. The first part 31a can be the same as the second part 33a. The first part 31a is engaged with the second part 33a by one or more hooks or screws.

Figure 8:
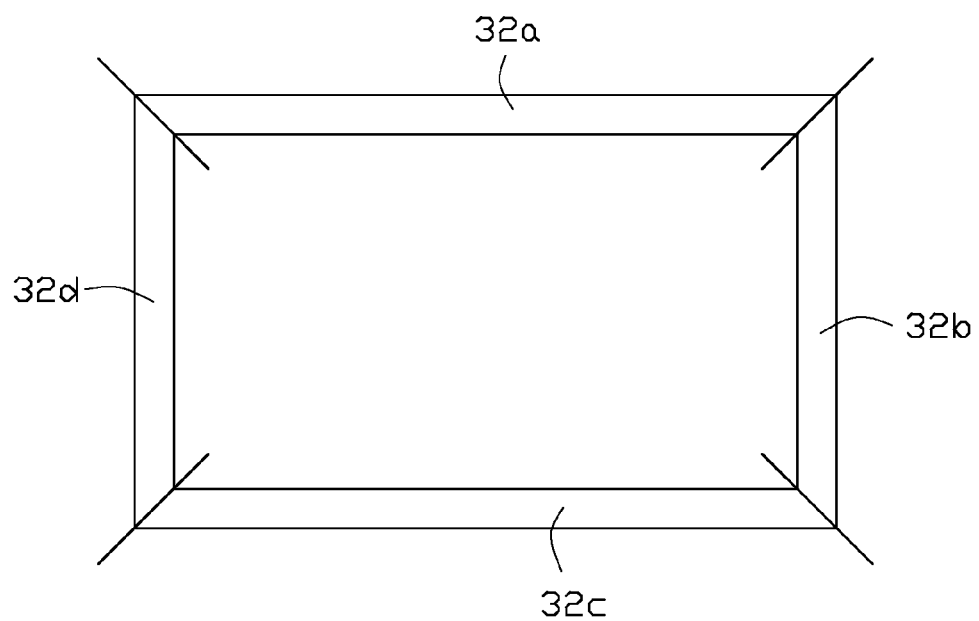
FIG. 8 is a schematic diagram of a frame of another embodiment of an electronic device enclosure.

FIG. 8 illustrates another embodiment of a frame 30. The frame 30 comprises a firs part 32a, a second part 32b, a third part 32c, and a fourth part 32d. In one embodiment, the first part 32a can be the same as the third part 32c, but different from the second part 32b. The second part 32b can be same as the fourth part 32d. The first, second, third, and fourth parts 32a, 32n, 32c, 32d can be engaged together by one or more hooks or screws. In one embodiment, a length of the first part 32a is less than a length of each second part 32b.

Figure 9:
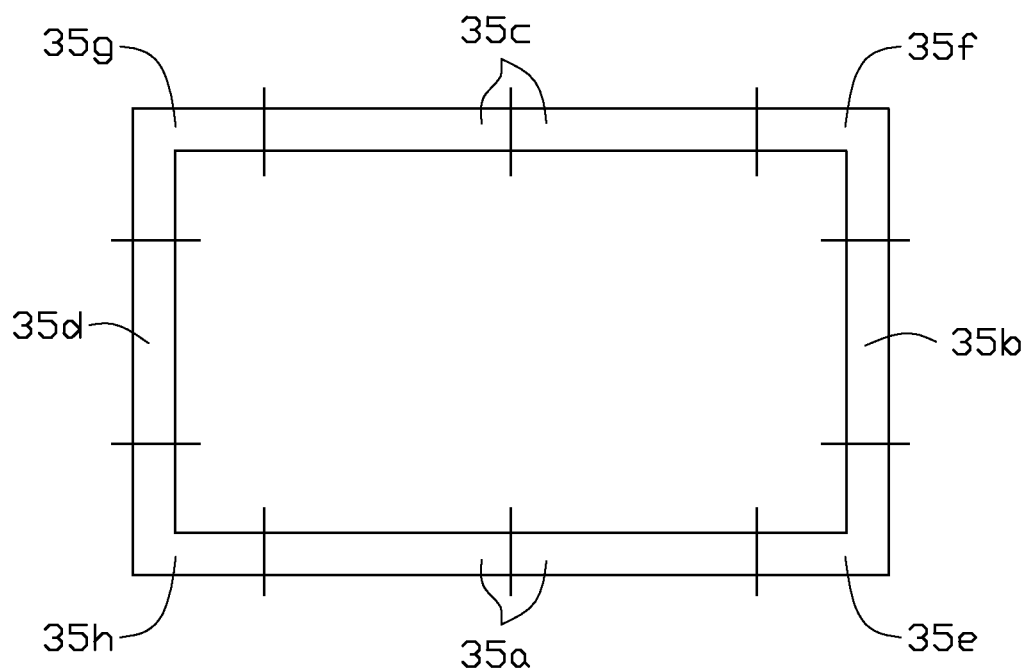
FIG. 9 is a schematic diagram of a frame of yet another embodiment of an electronic device enclosure.

FIG. 9 illustrates yet another embodiment of a frame 30. The frame 30 comprises a first part 35a, a second part 35b, a third part 35c, a fourth part 35d, a fifth part 35e, a sixth part 35f, a seventh part 35g, and an eighth part 35h. The first part 35a, the second part 35b, the third part 35c, the fourth part 35d, the fifth part 35e, the sixth part 35f, the seventh part 35g, and the eighth part 35h can be different from each other. In one embodiment, the first part 34a can be the same as the third part 34c, the second part 34b can be the same as the fourth part 34d, and the fifth part 35e, the sixth part 35f, the seventh part 35g, and the eighth part 35h can be the same as each other. The first part 35a, the second part 35b, the third part 35c, the fourth part 35d, the fifth part 35e, the sixth part 35f, the seventh part 35g, and the eighth part 35h can be engaged with the second part 33c by one or more hooks or screws. In one embodiment, each second part 33c is substantially L-shaped and located between two first parts 31c.

The rear cover 10 is divided into a plurality of segments, such as the first, second, third, and fourth segments 11a, 11b, 11c, 11d. The frame 30 is divided to a plurality of first parts, such as the first part 35a, the second part 35b, the third part 35c, the fourth part 35d, the fifth part 35e, the sixth part 35f, the seventh part 35g, and the eighth part 35hc. The first, second, third, and fourth segments 11a, 11b, 11c, 11d, or the first part 35a, the second part 35b, the third part 35c, the fourth part 35d, the fifth part 35e, the sixth part 35f, the seventh part 35g, the eighth part 35h, and the variety of the components, that are attached to the rear cover 10 or the frame 30, can be decreased. The rear cover 10 or the frame 30 is divided to the plurality of segments, such as the first, second, third, and fourth segments 11a, 11b, 11c, 11d, or the first part 35a, the second part 35b, the third part 35c, the fourth part 35d, the fifth part 35e, the sixth part 35f, the seventh part 35g, the eighth part 35h. Therefore, when the rear cover 10 or the frame 30 is transported, the first, second, third, and fourth segments 11a, 11b, 11c, 11d, or the first part 35a, the second part 35b, the third part 35c, the fourth part 35d, the fifth part 35e, the sixth part 35f, the seventh part 35g, the eighth part 35h can easily be transported.

It is to be understood, however, that even though numerous characteristics and advantages have been set forth in the foregoing description of the embodiments, together with details of the structures and functions of the embodiments, the disclosure is illustrative only and changes can be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a rear cover comprising at least one first segment and at least one second segment; the at least one first segment comprising a first securing portion, and the at least one second segment comprising a second securing portion; the first securing portion comprises two hooks, and the second securing portion comprises two parallel securing ribs, a clipping hole is formed between the two parallel securing ribs;
   wherein the two hooks are configured to deformably engage the clipping hole, so that the at least one first segment and at least one second segment together define the rear cover.

2. The electronic device enclosure of claim 1, wherein the at least one first segment is same as the at least one second segment.

3. The electronic device enclosure of claim 1, wherein the at least one first segment is different from the at least one second segment.

4. The electronic device enclosure of claim 1, further comprising a frame engaged with the rear cover, wherein the frame comprises at least one first part and at least one second part, and the at least one first part and the at least one second part together define the frame.

5. The electronic device enclosure of claim 4, wherein the at least one first part is same as the at least one second part.

6. The electronic device enclosure of claim 4, wherein a configuration of the at least one first part is different from a configuration of the at least one second part.

7. The electronic device enclosure of claim 1, wherein an acute angle is formed between the two hooks.

* * * * *